United States Patent
Kukla et al.

(10) Patent No.: US 6,735,189 B1
(45) Date of Patent: May 11, 2004

(54) FLEXIBLE CDMA COMBINER

(75) Inventors: Ralf-Dieter Kukla, Nuremberg (DE);
Bernd Dotterweich, Hirschaid (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/466,228

(22) Filed: Dec. 17, 1999

(51) Int. Cl.[7] ............................................. H04B 7/216
(52) U.S. Cl. ................................... 370/342; 375/355
(58) Field of Search ................................. 370/208, 210, 370/211, 229, 230, 235, 252, 321, 335, 342, 349, 431, 436, 441, 479, 480; 375/130, 147, 148, 152, 150, 149, 260, 349, 144, 355–358, 206, 267

(56) References Cited

U.S. PATENT DOCUMENTS

| | | | |
|---|---|---|---|
| 3,715,508 A | | 2/1973 | Blasbalg |
| 5,764,690 A | * | 6/1998 | Blanchard et al. ........... 375/147 |
| 5,881,057 A | * | 3/1999 | Komatsu ..................... 370/335 |
| 5,956,367 A | * | 9/1999 | Koo et al. ................... 375/149 |
| 6,009,089 A | * | 12/1999 | Huang et al. ................ 370/342 |
| 6,034,971 A | * | 3/2000 | Love et al. ................... 370/468 |
| 6,067,292 A | * | 5/2000 | Huang et al. ................ 370/342 |
| 6,377,613 B1 | * | 4/2002 | Kawabe et al. ............. 375/142 |
| 6,466,566 B1 | * | 10/2002 | De Gaudenzi et al. ..... 370/342 |
| 6,539,009 B1 | * | 3/2003 | Zhou et al. .................. 370/342 |
| 6,611,548 B2 | * | 8/2003 | Lomp .......................... 375/148 |
| 6,625,205 B1 | * | 9/2003 | Zhou et al. .................. 375/153 |

FOREIGN PATENT DOCUMENTS

| | | |
|---|---|---|
| EP | 0 304 841 | 3/1989 |
| GB | 2 295 527 | 5/1996 |
| WO | WO95/23464 | 8/1995 |
| WO | WO98/13952 | 4/1998 |

OTHER PUBLICATIONS

A. Annamalai et al., Mechanisms to Ensure a Reliable Packet Combining Operation in DS/SSMA Radio Networks with Retransmission Diversity, IEEE, pp. 1448–1452, 1998.
Harry Urkowitz, "Analysis and Synthesis of Delay Line Periodic Filters", IRE Transactions On Circuit Theory, pp. 41–53, 1998.

* cited by examiner

*Primary Examiner*—Dang Ton
*Assistant Examiner*—Phuc Tran

(57) ABSTRACT

A combiner (CMB) comprises a number (K) of subprocessing units (S1, S2, Sk) which each combine digital data values from input data sets with a higher processing rate. A single selector (M3) is used for cyclically reading out the addition results from the respective subprocessing units ($SU_1, \ldots, SU_k$). The invention allows to flexibly combine data from any desired input onto a specific output.

9 Claims, 7 Drawing Sheets

RAKE RECEIVER

FLEXIBLE CDMA COMBINER

This application claims priority under 35 U.S.C. §§119 and/or 365 PCT/IB98/02082 and EP 99116783.4 filed in the International Bureau and Europe on Dec. 18, 1998 and Aug. 31, 1999; the entire content of which is hereby incorporated by reference.

FIELD OF THE INVENTION

The present invention relates to a combiner for combining digital data samples from a predetermined number of inputs to a predetermined number of outputs, for example from a predetermined number of channels, onto a predetermined number of carriers of a digital communication system.

In telecommunication systems, a large number of channels, e.g. user channels containing voice or data signals, may be transmitted together via the same transmission medium, for example, via the same radio frequency band. A multitude of access schemes for placing the data of the user channels on the transmission medium is known. One class of transmission schemes simultaneously transmits a plurality of different user channels, e.g. in a radio frequency band, in such a way that they overlap in the time domain as well as in the frequency domain. A well-known access scheme of this class is the CDMA (Code Division Multiple Access) scheme.

Although the invention is not limited to the CDMA scheme and may be used in any digital communication system where a number of digital data samples from a predetermined number of inputs (e.g. user channels or some sort of preadded channels) must be combined flexibly onto a predetermined number of outputs, (e.g. carriers), the invention in particular relates to a flexible CDMA combiner, where the digital data samples are represented by weighted chips generated in a base station of a CDMA radio communication system.

BACKGROUND OF THE INVENTION

FIG. 1 shows a typical block diagram of a conventional baseband CDMA transmitter in a CDMA base transceiver station BTS. Data on a plurality of user channels ch-1, ch-2, ... ch-n are input to a channel encoder 1. Apart from channel coding itself, the channel encoder 1 may perform a QPSK modulation, time-alignment of the user data etc. The channel encoder 1 outputs a possibly complex-valued output data symbol stream (ODSS) which is input to a spreader/power weighting unit 2 which receives spreading codes and power weights for the individual channels. Each user channel is spread with a specific spreading code and after spreading each channel is power weighted before all channels $\phi1, \phi2, \ldots \phi_n$ are output to a combiner 3 where they are combined. Note that $\phi1, \phi2, \ldots \phi_n$ may refer to the real and imaginary parts of complex-value channels. The output of the spreader/power weighting unit 2 are sets of weighted chips which are output at a chip rate CLK. That is, within each period $t_0-t_1, t_1-t_2, \ldots t_{k-1}-t_k$ a single weighted chip of each channel is output parallely. Each weighted chip contains a predetermined number of bits, i.e. each digital data sample has a predetermined bit width (hereinafter denoted as in bit) due to power weighting.

In a CDMA communication system a (geographical) area is divided into several regions which are called sectors. In each sector, at least one and possibly more carriers are used where each carrier represents a particular frequency band. Within each sector the carrier can have a different number of channels. In the following description, the term "sector-carrier" represents basically a combination of a particular sector with a particular carrier (frequency band). The task of the combiner 3 is to combine the data of all the channels, which must be transmitted in a specific sector and on a specific carrier. Thus, the combiner 3 is essentially an adder which adds up the discrete instantaneous values of all channels belonging to a given sector-carrier. As is indicated in FIG. 1 there may be m sector-carriers sc-1, sc-2, ... sc-m.

Typically, in a CDMA transmitter, the number of channels to be added for each such sector-carrier is fixed by the hardware implementation. Since a separate (but identical) combiner hardware is used for each sector-carrier, this results in an equal number of channels on each sector-carrier of a base transceiver station BTS. On the other hand, in contradiction to this fixed equal number of channels, the network operator of a CDMA system faces in practice a different load in each of the sector-carriers. Therefore, the network operator would like to configure a variable number of user channels for each sector-carrier. For example, a base transceiver station BTS on a highway requires a higher number of user channels in the sectors covering this highway, whereas other sectors (for example covering a rural or mountainous area) may only have to handle a few user channels. Furthermore, the load in the individual sectors might also change over time, e.g. during rush-hours, holiday seasons or trade fairs.

Thus, having a fixed number of channels per sector-carrier implies that the network operator has always to provide a high number of user channels for all sector-carriers no matter whether or not they are actually required in a particular point in time.

Thus, it is desirable to provide the network operator with a flexible combiner, which allows the network operator to tailor the number of available channels per sector-carrier according to the load conditions in the system. With the flexible combiner the network operator could buy a standard base transceiver station BTS having the capability to process a certain total number of channels, and could adapt the base transceiver station BTS to the actual distribution of channels over the sectors and carriers without wasting ressources. The flexible combiner could return benefits also to the supplier with less cost for adapting his equipment to the customer's needs.

Prior Art Solutions

When the number of channels to be combined onto a specific sector-carrier is fixed and does not change over time a combiner as shown in FIG. 2-1 and denoted with reference numeral 3-1 can be used. In this combiner 3-1 the channels $\phi_1, \phi_2, \phi_3, \phi_4$ are invariably combined onto the sector-carrier sc-1 and the channels $\phi_{n-3}, \phi_{n-2}, \phi_{n-1}, \phi_n$ are combined onto the sector-carrier sc-m. The channels are respectively added in pairs in the adders ADD1, and stored in intermediate flip-flops FF1 whereafter the respective outputs are added by an adder ADD2 and the output of the adder ADD2 is stored in a further intermediate flip-flop FF2. This type of circuit must be provided for each of the m sector-carriers. For the example in FIG. 2-1, where 4 channels per sector-carrier are combined, n (total number of channels) is equal to m*4 (m: number of sector-carriers). The combiner 3-1 in FIG. 2-1 has the disadvantage that the channels are invariably combined onto the sector-carriers and furthermore, the combiner 3-1 needs quite an extensive hardware, since the respective circuits need to be provided m-times.

FIG. 2-2 shows a combiner 3-2 which allows to reduce the hardware complexity. Such a combiner is described in EP 98 121 518.9 filed by the same applicant as the present application. Essentially, the combiner 3-2 in FIG. 2-2 comprises m adders ADD5, m flip-flops FF5 and m flip-flops FF6. The outputs of the flip-flops FF5 are respectively coupled to the input of the adder ADD5 which also receives the output of a respective multiplexer MUX which is also provided m-times. If in FIG. 2-2, similarly as in FIG. 2-1, again 4 channels (such as $\phi_2$, $\phi_3$, $\phi_4$ or $\phi_{n-3}$, $\phi_{n-2}$, $\phi_{n-1}$, $\phi_n$) are to be combined onto each sector-carrier, then the respective adder ADD5 and the respective multiplexer MUX have to be operated at four times the chip rate CLK in order to add one weighted chip of each of the respective four channels in a single chip period 1/CLK. The limiting factor in FIG. 2-2 is thus the maximum operating frequency of the adder.

The combiner 3-2 of FIG. 2-2 provides more flexibility than the combiner 3-1, since for combining e.g. 8 instead of 4 channels per sector-carrier, the adder ADD5 could operate at twice the rate (i.e. 8*CLK) and the MUX could be provided with 8 instead of 4 inputs while in the combiner 3-1 a further hierarchical adder-stage would be necessary. However, the flexibility problem, i.e. that e.g. $\phi_1$ can only be used for the output sc-1, remains the same.

FIG. 2-3 shows a combiner 3-3 which increases the flexibility. The circuit in FIG. 2-3 is a modification of the circuit shown in FIG. 2-1. In FIG. 2-3 the combiner 3-3 comprises a number of multiplexers MUX at each input of the respective adder ADD3. For each sector-carrier, for example the sector-carrier sc-1, the adder ADD3 and the flip-flop FF3 are provided n/2-times and the multiplexer MUX is provided n-times. A control signal sel is applied to the individual multiplexers MUX in order to allow the adding of predetermined ones of the n-channels onto a single sector-carrier. If certain channels are not configured for one sector-carrier, they are set to 0 by the signal sel applied to the multiplexer. Whilst the circuit in FIG. 2-3 is far more flexible than the one in FIG. 2-2, since the combiner 3-3 allows to combine any input user channel onto any desired sector-carrier, there is an extensive hardware necessary in order to realize the circuit.

SUMMARY OF THE INVENTION

As explained above, the disadvantage of the combiner 3-1 in FIG. 2-1 is that it provides the same maximum number of e.g. 4 channels to a respective sector-carrier. Furthermore, each channel is invariably attributed to a specific sector-carrier. Therefore, it is for example not possible to feed any of the channels $\phi_{n-3} \ldots \phi_n$ to a sector-carrier other than sc-m. Thus, the circuit in FIG. 2-1 offers no flexibility and the hardware is inefficiently used. The combiner 3-2 in FIG. 2-2 uses the hardware more efficiently due to the provision of the multiplexer MUX, but it still has no flexibility because it still provides the same number of e.g. 4 channels to a predetermined sector-carrier and does not allow to feed the channels to an arbitrarily selected sector-carrier. Whilst the combiner 3-3 maximizes the flexibility and allows to combine any channel onto any desired sector-carrier, the hardware is very extensive to realize such a circuit. That is, hardware is wasted, because some of the adders may not be needed in particular ones of the sectors. If one considers that a typical number for n in a CDMA radio communication system is n=24 (furthermore, in a practical implementation, each of 24 input channels to the combiner could be constituted by 32 preadded channels, i.e. $\phi_1$=ch1+ch2+ . . . ch32; $\phi_2$=ch33+ ch34+ . . . ch64 etc., where "ch" denotes a particular user channel), there is an extremely high hardware effort necessary to realize the flexibility in channel combining when using the circuit 3-3 in FIG. 2-3.

The object of the present invention is to provide a combiner which can combine in a flexible way a predetermined number of user channels onto a predetermined number of carriers without using complicated hardware.

Solution of the Object

This object is solved (claim 1) according to the invention by a combiner for combining digital data samples from a predetermined number n of inputs onto a predetermined number m of outputs, said digital data samples having a predetermined bit width and arriving parallely at said combiner as data sets respectively consisting of one data sample from each input at a predetermined common sample rate CLK, including a plurality of k subprocessing units $SU_1$, $SU_2, \ldots, SU_{i-1}, SU_i, \ldots, SU_k$ which each comprises an input register for downsampling and storing arriving data sets at a clock rate of CLK/k, and a multiplex/add means for receiving said data sets stored in said input register and for outputting at said clock rate of CLK/k, for each of said m outputs, an added data sample respectively formed by an addition of predetermined ones of said stored data samples; and a selector for cyclically selecting at said common data rate CLK from said multiplex/add means of said subprocessing units a respective output data set consisting of said m added data samples, and wherein the sampling phase of the input register of subprocessing unit $SU_i$ is delayed by 1/CLK with respect to the sampling phase of the input register of the subprocessing unit $SU_{i-1}$ with i in the range of $2, \ldots, K$.

This object is also solved (claim 9) by a combiner for combining digital data samples from a predetermined number n of inputs onto a predetermined number m of outputs said digital data samples having a predetermined bit width (in_bit) and arriving parallely at said combiner as data sets respectively consisting of one data sample from each input at a predetermined common data rate CLK, comprising a plurality of k subprocessing units $SU_1$, $SU_2, \ldots, SU_{i-1}$, $SU_i, \ldots, SU_k$ which respectively include an input register for downsampling and storing arriving data sets at a clock rate of CLK/k; and a multiplex/add means for receiving said data sets stored in said input register and for outputting at said clock rate of CLK/k, for each of said m outputs, an added data sample respectively formed by an addition of predetermined ones of said stored data samples, and a selector for cyclically selecting at the common data rate CLK from said multiplex/add means of said subprocessing units a respective output data set consisting of said m added data samples; and wherein the sampling phase of the input register of subprocessing unit $SU_i$ is delayed by 1/CLK with respect to the sampling phase of the input register of the subprocessing unit $SU_{i-1}$, where i=2,3, . . . ,k, wherein an input means is provided for inputting the data sets to each of said input registers of said k subprocessing units at the common data rate CLK, wherein each of multiplex/add means comprises a multiplexer for sequentially selecting, for each of said m outputs, said predetermined ones of said stored data samples, at a clock rate of OS*CLK, where OS=n/k is an oversampling factor; an adder for adding for each of said m outputs said selected data samples into said respective added data sample at said clock rate OS*CLK; and an output register for storing for said m outputs an output data set comprising said m added data samples, wherein said selector selects said output data sets from said respective output register of said subprocessing units; and an output means is provided for outputting said selected output data sets on said outputs at said common data rate CLK, wherein each adder comprises a first adder register taking in said samples selected by said multiplexer at said clock rate of OS*CLK and an addition unit receiving as inputs an output from said first adder register and an output from an adder multiplexer and outputting added samples of said inputs to a second adder register taking in said added samples at said clock rate of OS*CLK, said adder multiplexer receiving as inputs an output from said second adder register and a digital "0" signal.

Such combiners provide for two kinds of flexibility, namely each input channel can reach each output and the number of input channels to be combined onto an output can be variable from output to output. The principle idea of the invention is to provide a plurality of subprocessing units each of which is provided with a respective set of data samples at each k-th chip period, i.e. at a rate of CLK/k. In the subprocessing units the selection and adding is carried out at an oversampling rate which is higher than the chip rate. The output of each subprocessing unit is an intermediate downsampled result for the outputs (sector-carriers) 1 to m. The selector reads out these intermediate results and interleaves them to form a result at the chip rate CLK.

Therefore, instead of providing a large number of multiplexers as in FIG. 2-3, the basic concept of the invention is to provide subprocessing units k-times whilst increasing the processing rate in the subprocessing units. Therefore, the flexibility is maintained and the hardware complexity is minimized. Thus, the hardware costs can be reduced.

ADVANTAGEOUS EMBODIMENTS

Each adder in the subprocessing unit can preferrably comprise a first adder register taking in said samples selected by said multiplexer at said clock rate of OS*CLK and an addition unit receiving as inputs an output from said first adder register and an output from an adder multiplexer and outputting added samples of said inputs to a second adder register taking in said added samples at said clock rate of OS*CLK, said adder multiplexer receiving as inputs an output from said second adder register and a digital "0" signal, similarly as the adder shown in FIG. 2-2.

Further advantageous embodiments of the invention are listed in the dependent claims. Hereinafter, the invention would be described with reference to its advantageous embodiments. However, it should be noted that the teaching as disclosed in the description is not limited to the specially preferred embodiment which is currently considered to be the best mode of the invention. That is, on the basis of the description, the drawings and the claims various modifications and variations of the invention are possible. In particular, the invention can comprise embodiments which result from a combination of features which have been separately described in the specification and/or listed in the appended claims.

BRIEF DESCRIPTION OF THE DRAWINGS

FIG. 2-1 shows a first example of a CDMA combiner according to the prior art;

FIG. 2-2 shows a second example of a CDMA combiner according to the prior art;

FIG. 2-3 shows a third example of a CDMA combiner according to the prior art;

FIG. 3 shows a principle overview diagram for explaining the principle of the invention;

It should be noted that in the drawings the same reference numerals denote the same or similar parts throughout. Hereinafter, the principle of the invention will be described with reference to FIG. 3.

PRINCIPLE OF THE INVENTION

Figure 1:
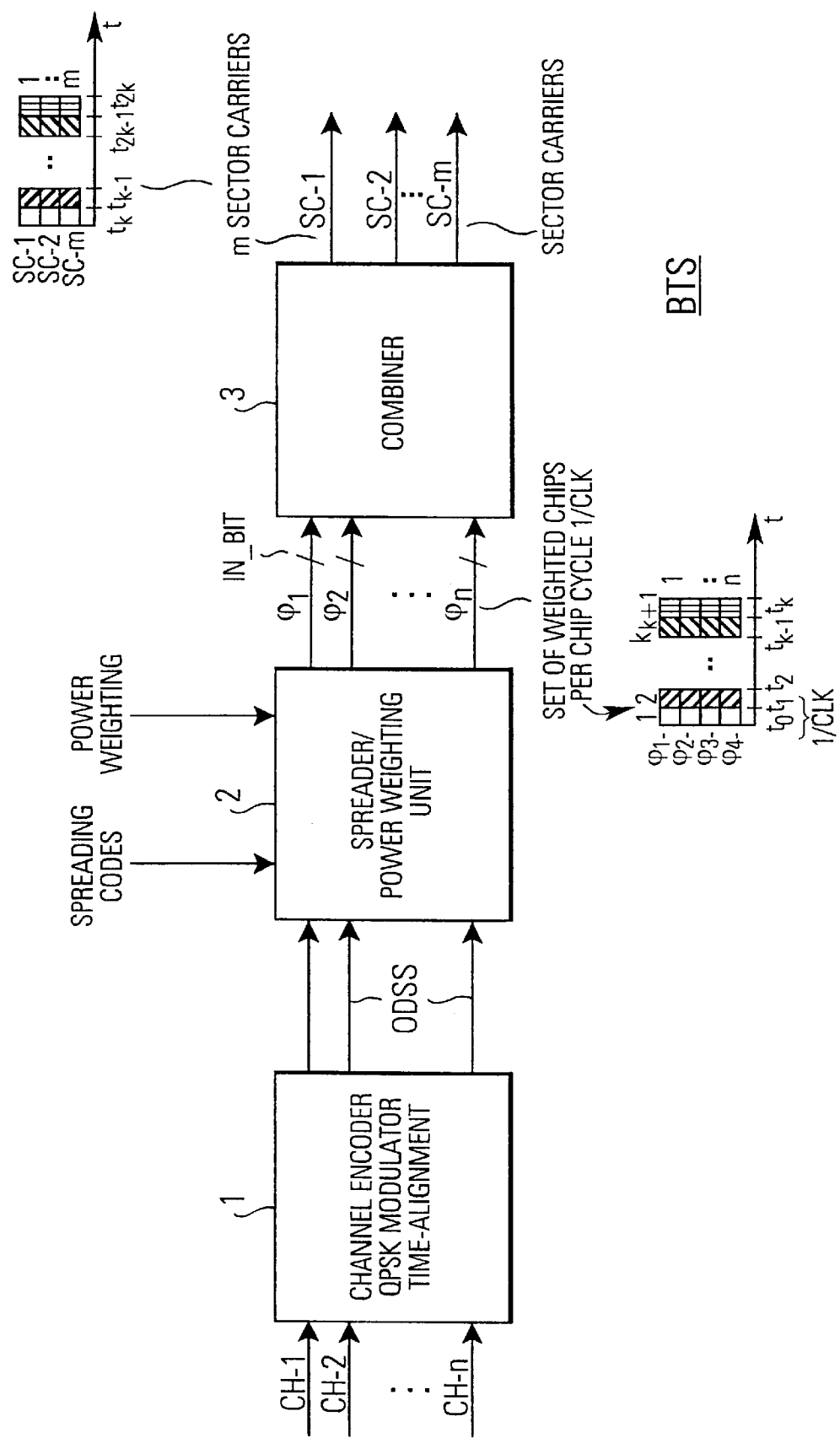
FIG. 1 shows a principle block diagram of a baseband CDMA transmitter.
Figures 1, 2:
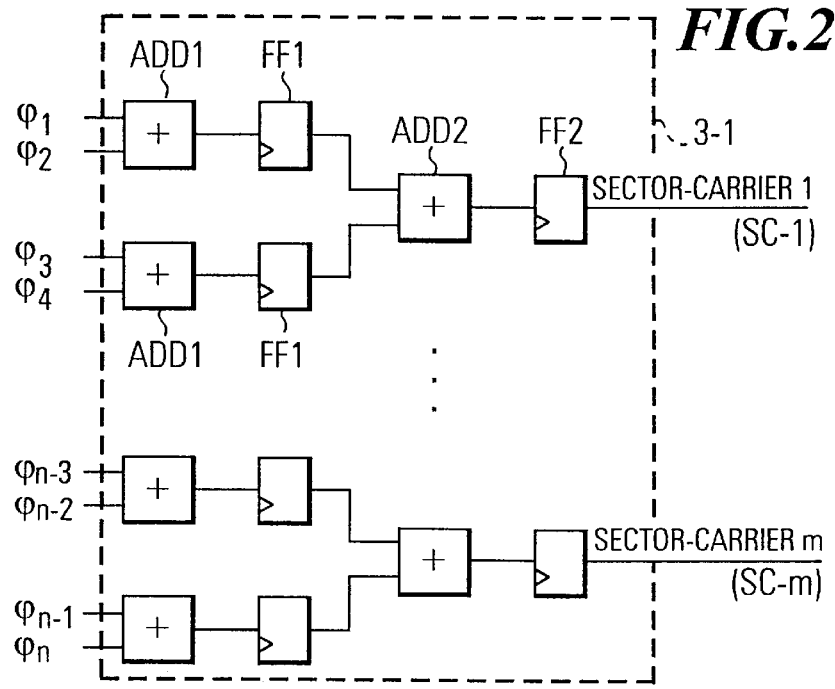
Figures 2, 3:
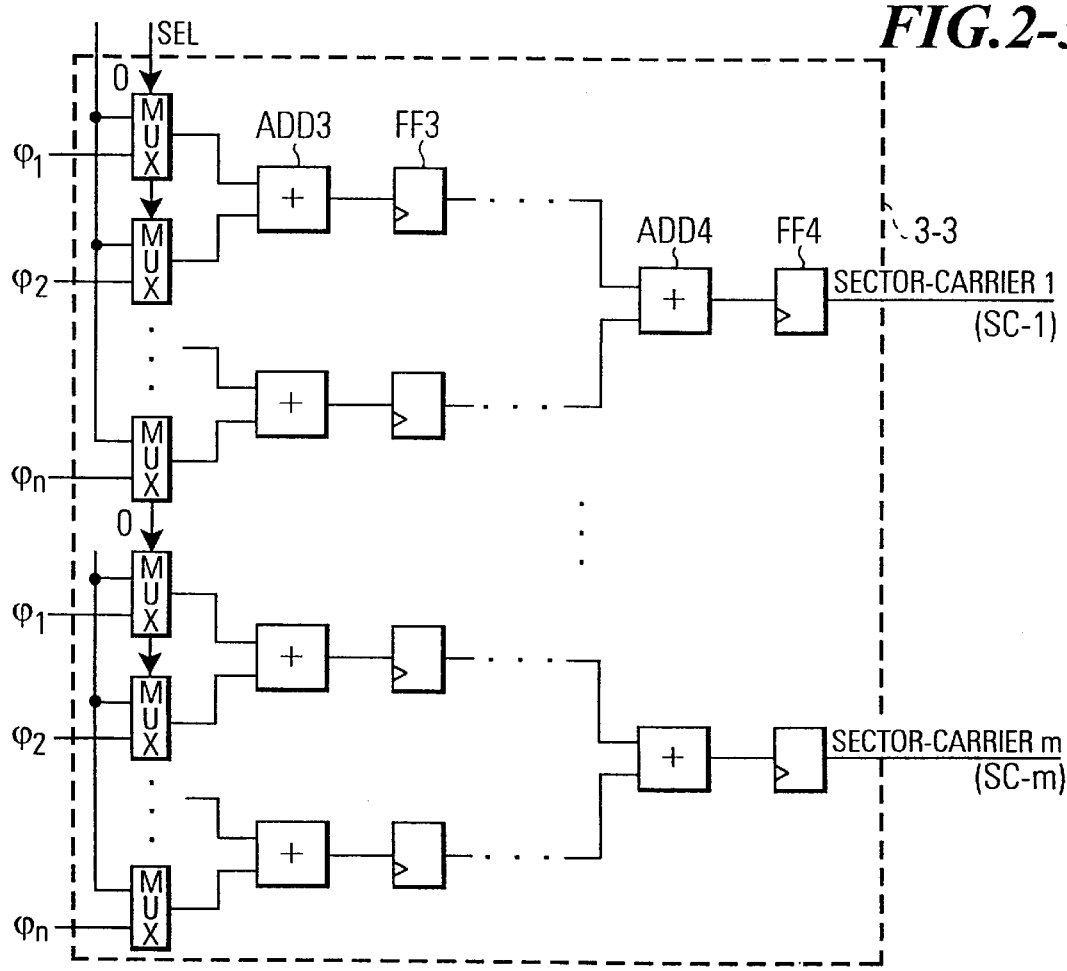
Figure 2:
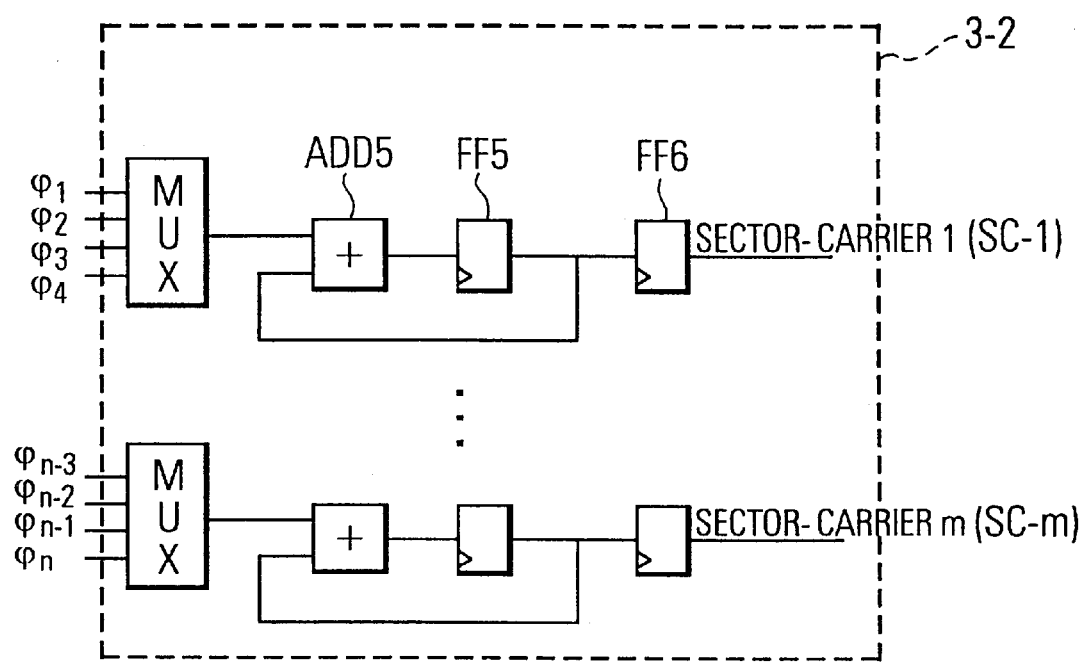
Figure 3:
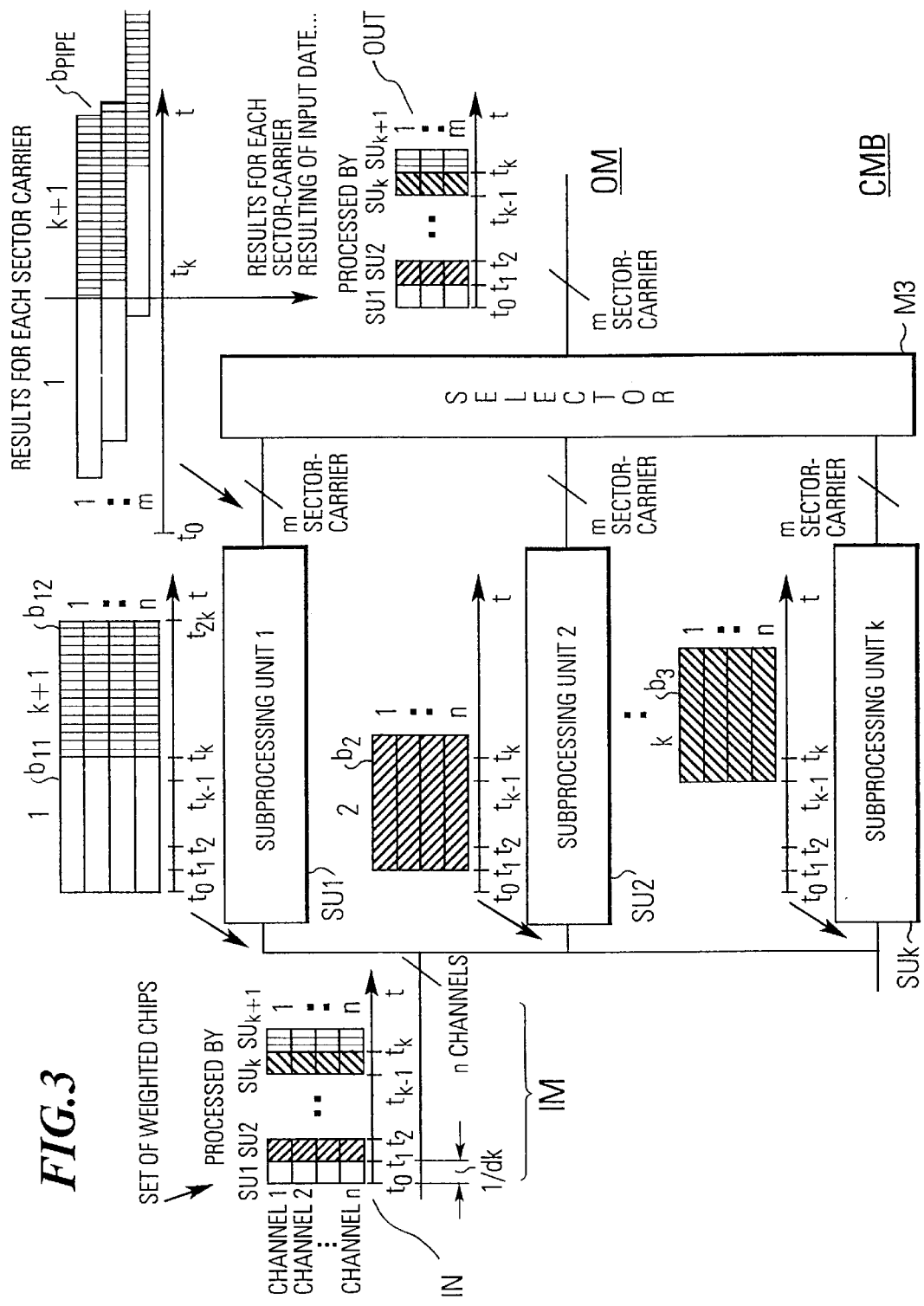

FIG. 3 shows a principle block diagram of a combiner CMB operating according to the principles of the invention. It should be noted that FIG. 3 and the following figures refer to a CDMA communication system, where the digital data samples are respectively weighted chips output from a spreader/power weighting unit 2 as shown in FIG. 1. However, the invention can be applied to any other application (e.g. in a RAKE receiver) where digital data samples from a plurality of inputs are to be combined onto a number of outputs in a very flexible way.

As shown in FIG. 3, digital data samples, such as weighted chips (each set has a predetermined bit width as explained below) arrive parallely at said combiner CMB. In FIG. 3 a "set of weighted chips" denotes the samples arriving e.g. between $t_0$ and $t_1$. Thus, a set of weighted chips consists exactly of n weighted chips, i.e. one chip per channel. As explained with reference to FIG. 1, the data sets of weighted chips arrive at a predetermined common sample rate (chip rate) CLK. It should be understood that in the CDMA system each weighted chip consists of a predetermined number of bits. The sets of weighted chips are applied in a specific manner to subprocessing units SU1, SU2, . . . , SUk at the chip rate. In total there are k subprocessing units SU1, SU2, . . . , SUk and a selector M3 is provided for all subprocessing units. As is indicated with the block "out" on the right side of the selector M3, the output "out" from the combiner CMB are m added (combined) weighted chips for m sector-carriers. The output from the selector M3 also has a rate equal to the chip rate.

Whilst in FIG. 3 each small squared box in the block "in" on the left side corresponds to one weighted chip of each channel, the small squared boxes in the block "out" on the right side of the selector M3 correspond to added data samples, i.e. a predetermined number of digital data samples, i.e. a predetermined number of channels have been added up for each sector-carrier at each output clock period 1/CLK. Although the hatching used on the left side squared boxes and on the right side squared boxes is the same, it should be understood, that the boxes on the right side correspond to added weighted chips whereas the boxes on the left side correspond to single weighted chips per channel.

As is indicated with the arrow on the right side of the subprocessing unit SU1, each subprocessing unit calculates the combination of digital data samples for m sector-carriers. That is, in contrast with the prior art combiners shown in FIG. 2-1, FIG. 2-2 and FIG. 2-3, in the inventive combiner in FIG. 3 no hardware (or even parts of hardware) is specifically dedicated to a particular sector-carrier. However, there is a hardware subprocessing unit which calculates output values (added digital data samples) for all sector-carriers. Since one such subprocessing unit cannot produce all results at the chip rate, k subprocessing units working on downsampled input sequences are used such that more time is gained to calculate the results for all sector-carriers within one subprocessing unit sequentially. After having calculated all m results within one subprocessing unit for a set of weighted chips, i.e. for a set of digital data samples collected from predetermined user channels, the selector M3 switches through all results corresponding to this subprocessing unit and outputs a set of m values. Exactly one chip period later the selector M3 reads out all results from the next subprocessing unit, for example the subprocessing unit SU2. As is shown in the block "out" on the right side of the selector M3, the result is that in the chip period $t_k$–$t_{k+1}$ the subprocessing unit SU1 outputs its results, i.e. the added weighted chips for all m sector-carriers. This is followed in the next chip period by the output from the subprocessing unit SU2 and this is continued until the subprocessing unit SUk outputs its results in the clock period beginning with $t_{2k-1}$. Exactly at the end of reading out the data from the subprocessing unit SUk, it is the subprocessing unit SU1 which has finished its selection and adding process for the next set of weighted chips and therefore in the chip period beginning with $t_{2k}$ again the subprocessing unit SU1 is read out.

As explained before, the processing is therefore distributed to k subprocessing units which however must operate at a higher (i.e. oversampling) rate. Thus, no subprocessing unit is dedicated to a specific channel. The subprocessing units SU1, SU2 . . . SUk are respectively provided for combining respective weighted chips for all m sector-carriers and the selector M3 performs a cyclic reading of the subprocessing units. One can say that each subprocessing unit is dedicated to combine channels at a rate k times inferior to the chip rate and to produce outputs for all sector-carriers at this reduced rate, i.e. SU1 for the chip periods $t_k$–$t_{k+1}$, $t_{2k}$–$t_{2k+1}$ etc., SU2 for the chip periods beginning with $t_{k+1}$, $t_{2k+1}$ etc.

In order that the selector M3 can respectively access or read out the respective subprocessing units SU1, SU2, . . . SUk in the respective chip period, the subprocessing units must operate at a higher speed such that in the worst case each subprocessing unit is capable to produce per k/CLK period (i.e. not per 1/CLK period) m added weighted chips resulting from an addition of weighted chips from all n channels.

Therefore, if n designates the number of channels, and k designates the number of subprocessing units, then an oversampling rate OS of OS=n/k must be used for the adding process within each subprocessing unit. This is indicated with the rectangular blocks $b_{11}$, $b_{12}$, $b_2$, $b_3$ of the data sets shown above each subprocessing unit. That is, the respective set of weighted chips must be held k chip periods, i.e. the clock rate for inputting and holding new data in the subprocessing unit is CLK/k if CLK designates the chip rate at the input. Since the selector M3 cyclically reads out data from k subprocessing units, it is clear that the subprocessing units must finish their combining (adding) of data values for n input chips and m sector-carriers within k chip periods.

That is, since each subprocessing unit must add at most n weighted chips at a rate of CLK/k (to calculate m results), its adder must operate at n*CLK/k, i.e. at OS*CLK. That is, not the number of results is decisive but the total number of additions which are needed for all results together.

For example, within the time period $t_0$–$t_k$, the addition and holding for all weighted chips of the blank squared boxes in the block $b_{11}$ is carried out. Only k chip periods later the next set of chips (vertically hatched $b_{12}$) need to be processed in the subprocessing unit SU1, since the k−1 other subprocessing units take care of the adding of chips in the chip periods starting with $t_1$ . . . $t_{k-1}$ (left . . . right hatched squared boxes). This processing is taken over by the subprocessing unit SU2 etc. up to the chip period $t_{k-1}$ in which the data is combined by a subprocessing unit SUk. Therefore, the respective blocks $b_{11}$, $b_{12}$, $b_2$, $b_3$ respectively indicate that the input data is held for k pulses of the clock CLK. It is also clear, that due to the sequentially arriving data sets at periods $t_0$, $t_1$, $t_2$ . . . $t_{k-1}$, $t_k$ the start of a processing in subprocessing unit $SU_i$ is delayed by exactly one chip period with respect to the previous subprocessing unit $SU_{i-1}$.

As indicated with the block $b_{pipe}$, within the processing units the results for each sector-carrier are generated sequentially. That is, first the added weighted chip for the first sector-carrier 1 is calculated wherein the adding is performed sequentially for the required channels. Subsequently, the added weighted chip for the second sector-carrier is produced. Since the processing for the second sector-carrier can only start once the processing for the first sector-carrier has been finalized, the processings per sector-carrier are delayed as indicated in the block $b_{pipe}$. However, all m results are ready when the next set of chips arrives, such that the first subprocessing unit SU1 can again start with a processing for the weighted chips beginning at $t_k$. Thus, the solution is based on a kind of delayed pipeline processing together with the cyclical reading by the selector M3. This procedure uses the processing capabilities very efficiently and therefore reduces the hardware costs.

It should be noted that the order of processing for the sector-carriers within each subprocessing unit is fully flexible. Only one restriction exists, namely that each weighted chip can only be added to one sector-carrier output.

Furthermore, it should be noted, that the number of subprocessing units k can be freely selected. Of course, at each cycle of OS*CLK one channel can be processed depending on the oversampling rate OS. For example, if the oversampling rate is OS=8 and the number of channels is n=24, then k=n/OS=3 subprocessing units will be used operating internally at a processing speed of OS*CLK= 8*CLK.

Therefore, one can say that an input means IM inputs the sets of weighted chips (sets of digital data samples) at the chip rate to all subprocessing units SU1, SU2, SUk. After downsampling by a factor of k, each subprocessing unit then calculates sets of m added weighted chips at the down-sampled rate using a processing clock of OS*CLK. The selector M3 reads out the sets of added weighted chips cyclically from the subprocessing units at the common chip rate CLK. An output means OM outputs the respective data sets.

As can be understood from the above description of the combiner CMB in FIG. 3 according to the invention, there is the flexibility that each sector-carrier can be provided (at chip rate) with added weighted chips resulting from arbitrary combinations of input weighted chips of an arbitrary number of channels, i.e. from all n channels if there is the necessity to do so. On the other hand, only k subprocessing units operating at the higher speed of OS*CLK are needed. Thus, the hardware amount necessary is drastically reduced while the flexibility to combine any channel with any other channel onto arbitrary sector-carriers is fully provided.

Furthermore, the following advantages are achieved by the combiner according to the invention:
 1. The flexibility to allocate a variable number of channels to each sector-carrier is achieved. This is very much needed by the network operator to be able to configure the number of available channels to fit the expected traffic conditions (highway ⇔ mountains).

2. The flexibility to temporarily add more channels to a sector-carrier is provided, something that is needed for the operator to handle different traffic loads at different times (e.g. holiday times, repair of a neighboring base station, trade fares, . . . ) as explained in the introduction.
3. The flexibility to provide any combination of an arbitrary subset of channels to any given sector-carrier such that the channels can be switched from another sector-carrier at a given time due to the foreseen or predicted traffic gradient.
4. The component reuse is very high resulting in very little hardware costs. At least 85% of the hardware can be saved in comparison with the solution in FIG. 2-3.
5. It is possible to generate a generic hardware for the customer. That is, the hardware can be tailored by the customer himself/herself to his/her needs. This reduces the costs for the manufacturer, since less variants and less customizations in production will be necessary.

Figure 4:
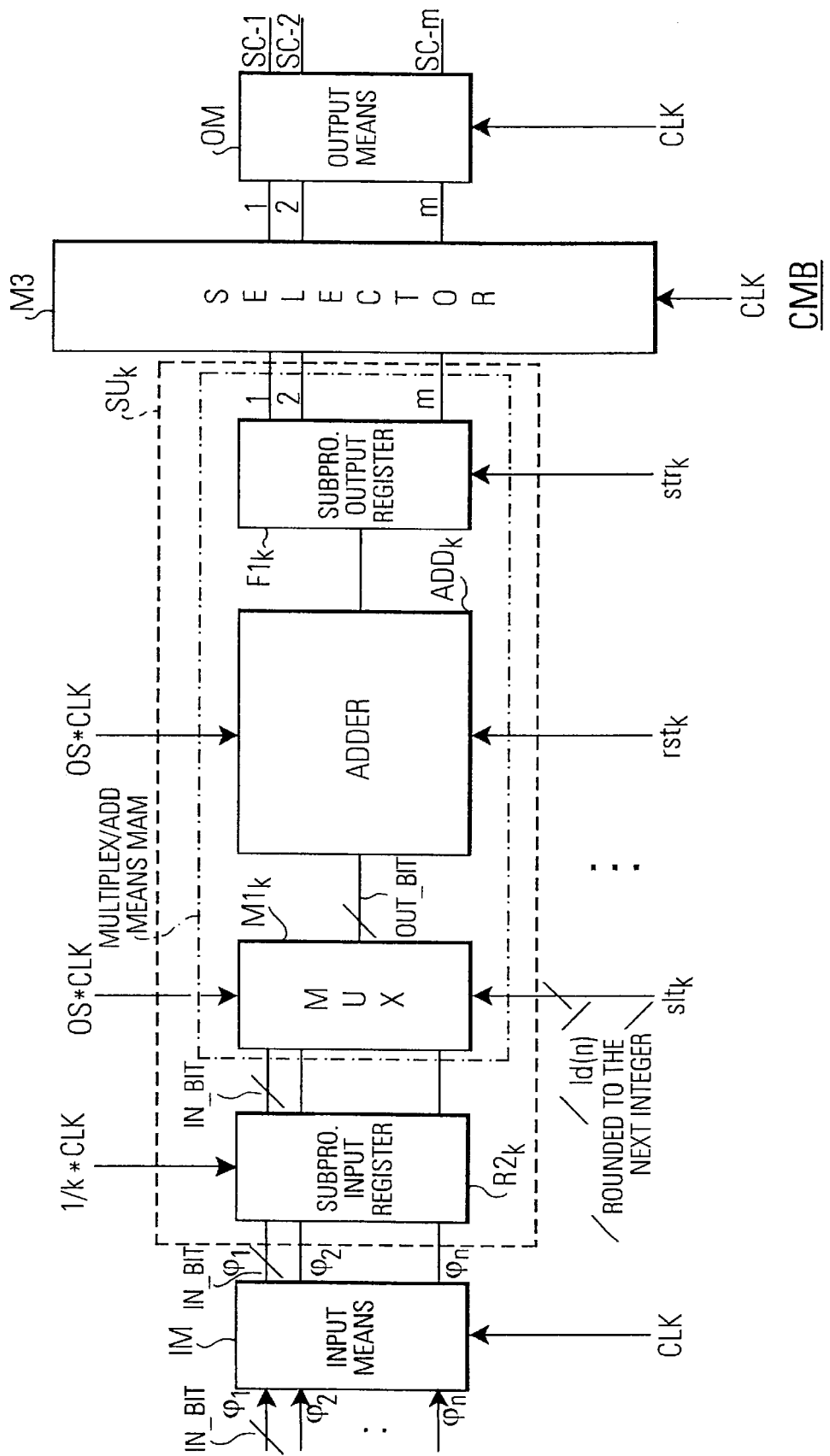
FIG. 4 shows an embodiment of the subprocessing unit Sk shown in FIG. 3 together with the input means IM, the output means OM and the selector M3.
Figure 5:
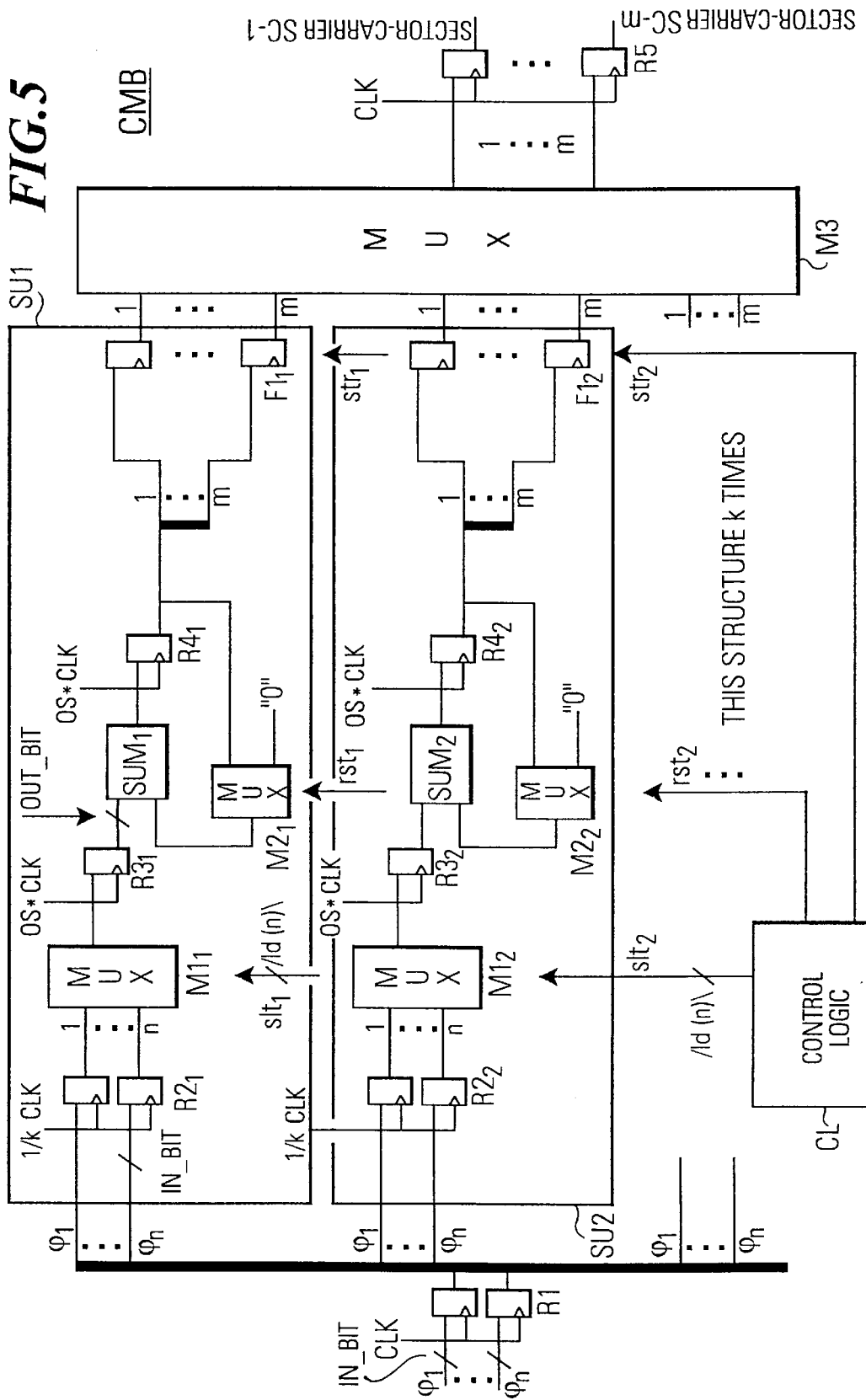
FIG. 5 shows the combiner of FIG. 3 where a more concrete circuit configuration is shown for each of the subprocessing units S1, S2 together with a control logic CL.

Hereinafter, a more specific block diagram of the combiner CMB shown in FIG. 3 is illustrated and discussed in FIG. 4, whereas a specific circuit configuration of the subprocessing units SUk shown in FIG. 4 is illustrated in FIG. 5.

FIRST EMBODIMENT OF THE INVENTION

A combiner CMB shown in FIG. 4, combines digital data samples from a predetermined number n of channels, e.g. user channels, $\phi_1, \phi_2, \ldots, \phi_n$ onto a predetermined number m of outputs, e.g. sector-carriers sc-1, sc-2, . . . , sc-m of a digital radio communication system. It is also possible that the channels are preadded channels. For example, in a practical implementation, the n=24 input channels to the combiner could each be constituted by 32 preadded channels, i.e. $\phi_1$=ch1+ch2+ . . . ch32; $\phi_2$=ch33+ch34+ . . . ch64 etc., where "ch" denoted a particular user channel.

The digital data samples have a predetermined bit width in bit and arrive parallely at said combiner as data sets respectively consisting of n data samples at a predetermined common data samples rate CLK. That is, at each fixed point in time "$t_k$" n data samples belonging to n channels arrive. There are provided a plurality of k subprocessing units of which the subprocessing unit SUk is shown in FIG. 4. An input means IM inputs the data sets to each of said k subprocessing units at said common data rate CLK.

As shown in FIG. 4, each of said subprocessing units SUk comprises an input register $R2_k$ for storing the data sets at a clock rate of CLK/k. A multiplexer $M1_k$ is provided for sequentially selecting a predetermined number of data samples from a respective data set stored at said input register for each of said m sector-carriers at a clock rate of OS*CLK, where OS is an oversampling factor and k=n/OS. From a control unit CL (shown in FIG. 5) the multiplexer $M1_k$ receives a select signal $slt_k$ which indicates the channels to be combined.

An adder $ADD_k$ is provided for adding, for each of said m sector-carriers, said selected data samples into a respective added data sample (added weighted chip) at said clock rate OS*CLK. An output register $F1_k$ is provided to store for said m sector-carriers an output data set comprising said m added data samples.

A selector M3, generally already described above with reference to FIG. 3, cyclically selects at said common data rate CLK from a respective output register of said subprocessing units a respective output data set. An output means OM outputs the selected data sets on said sector-carriers SC-1, . . . SC-m at said common data rate CLK.

Although not shown in FIG. 4, of course the subprocessing units SUk are provided k-times, whereas the input means IM, the selector M3 and the output means OM are only provided once, as will be further explained with reference to FIG. 5.

As is shown in FIG. 4, each respective data set consisting of n data samples is held in the input register R2k at the clock rate of CLK/k. Since the multiplexer MUX and in particular the adder operate at the clock rate of OS*CLK (where OS=n/k) it is possible to add for m sector-carriers sequentially all input weighted chips. The timing within the subprocessing unit is adjusted according to the worst case scenario, i.e. for one sector-carrier the added weighted chip can consist of an addition of all n input weighted chips from n channels stored in the input register R2k. That is, the worst case scenario is that all $\phi_1-\phi_n$ are added onto one sector carrier. Therefore, all other sector-carriers give the value 0 (a particular input channel $\phi_i$ can then only go to one determined sector-carrier $sc_j$ and not to more than one).

If some added weighted chips only consist of an addition of a smaller number of input weighted chips, then of course the results can be stored in the intermediate output register $F1_k$ earlier. However, this poses no problem, since the selector M3 only accesses the output register $F1_k$ at the rate CLK/k, such that an earlier storage of values in the output register is within the necessary reading timings of the selector M3.

Furthermore, as shown in FIG. 4, the adder $ADD_k$ must receive a reset signal $rst_k$ from the control unit CL (shown in FIG. 5) whenever the adding of the data samples has been finalized for a given sector-carrier. That is, every k chip periods the adder is reset at most m-times (if e.g. all m sector-carriers are used, as in the above explained worst case scenario). The output register $F1_k$ receives a storage signal $str_k$ from the control logic CL when it is supposed to store or read out a specific data set.

The input register $R2_k$ is necessary, since the data values input from the input means IM must be kept available for a period of time longer than the chip period. Otherwise, the multiplexer MUX can not select flexibly all weighted chips from all n channels to be added to one of the sector-carriers. Whilst the multiplexer MUX performs a selection of chip data, the adder $ADD_k$ performs a sequential adding of all the chip data selected sequentially by the multiplexer MUX. As explained above, the output register is necessary, since the result (the added chip value or added digital data sample value) may be available earlier for the case when not all n chips are added and allocated to one sector-carrier.

Hereinafter, a more specific circuit configuration of the block diagram of the inventive combiner CMB shown in FIG. 4 will be described with reference to FIG. 5.

Example of the Subprocessing Units

As explained with reference to FIG. 4 above, the input data sets (sets of weighted chips in a CDMA system) arrive at the combiner CMB at the chip rate CLK. Each digital data sample (each weighted chip) is first stored in the input means IM which is constituted by a register R1 in FIG. 5. As is shown in FIG. 5, the storage takes place at the chip rate CLK. Each digital data sample has a certain bit width in bit and the input means R1 comprises a set of registers where the number of the registers corresponds to n, i.e. for n input channels n words of a bit width in__bit are to be stored (per channel in__bit). There are n registers R1 because n input channels input respectively weighted chips or in general digital data samples.

As explained above, the processing in the subprocessing unit SU1, SU2, . . . SUk takes place with an oversampling factor OS with respect to CLK (for example CLK=4 MHz, OS=8). Therefore, the subprocessing unit is provided k=n/OS times. Consider the example of n=24 and OS=8: at each cycle of OS*CLK, one channel can be processed. To process all channels within one subprocessing unit, 24 cycles of the rate OS*CLK are needed. Since new sets of weighted chips arrive at the rate CLK, these have to be stored at other subprocessing units. At n/OS cycles of CLK, the results for all sector-carriers are calculated within a substructure. Therefore, a total number of k=24/8=3 subprocessing units is needed to process all channels within one subprocessing unit.

Therefore, the contents of the register R1 changes at the chip rate CLK. As explained above, within each subprocessing unit SU1, SU2 . . . SUk the respective weighted chips have to be available longer than the chip period. Therefore, the input registers $R2_1$, $R2_2$, $R2_k$ are provided with input values at the rate CLK/k where it should be understood that also each of the input registers R2 has a predetermined bit width in bit. However, whenever a set of data values arrives, they are parallely applied to each subprocessing unit SU1, SU2 as shown in FIG. 5, the only difference being that the subprocessing unit with the next higher index starts its processing with a delay of a chip period 1/CLK. Thus, the sampling phase of the input register $R2_i$ of subprocessing unit $SU_i$ is delayed by 1/CLK with respect to the sampling phase of the input register $R2_{i-1}$ of the subprocessing unit $SU_{i-1}$. The registers R2, preferably realized as flip-flops, have a rate of CLK/k, wherein the subprocessing unit with the next index is delayed by one clock cycle as is indicated in FIG. 3. For example, if the same values as explained above are used, then each register set $R2_1$, $R2_2$ . . . has to have a rate of CLK/3, since there are k=3 subprocessing units.

The multiplexer $M1_1$ of the first subprocessing unit switches the channels through in the order, in which the channels (more specifically their respective single weighted chips) have to be added up for each sector-carrier sequentially. The select signal $slt_k$ from the control unit CL indicates to the respective multiplexer the indices of the channels to be combined. That is, $slt_k$ does not indicate how many channels are to be added, but which channel is to be switched through.

That is, the multiplexer $M1_1$ (and also the other multiplexers receives a select signal $slt_1$ from the control logic CL in order to sequentially select data values from those values stored in the input register $R2_1$. Of course, the multiplexer also increases the bit width of the channels. Since the adder must have a fixed bit width at its input and in the worst case all channels are added to each other where the result is transferred to one sector-carrier, the bit width may increase to out bit=/(ld(n($2^{in\ bit}-1$))\, wherein /x\ denotes the ceiling operation selecting the smallest integer value equal to or larger than x. If the value of a weighted chip, represented in a twos-compliment, is negative, then the multiplexer $M1_1$ prepends logic ones to the most significant bits, otherwise zeros.

For example, when in_bit=3 and $\phi_4$ has the value −2, then the twos complement of 2 using 3 bits is 010. Inverting this leads to 101 and adding 1 gives 110 ↔−2.When out_bit=5 and $\phi_4$ has the value −2, then the twos complement of 2 using 5 bits is 00010, inverting this leads to 11101 and adding 1 gives 11110 ↔−2.That is, for expanding the 3 bits which are stored in register $R2_1$ (110) to 5 bits, the bit positions 4, 5 must be filled with ones. A negative value is always recognizable at the most significant bit (here bit 3). If this value is 1 (=negative) this means that the preceding bits positions 4,5 are set to 1. If alternatively the most significant bit is 0 (=positive) the preceding bit positions 4, 5 are set to 0.

As is indicated in FIG. 5, the multiplexer $M1_1$ is connected with the respective register which stores the respective input weighted chip value from the respective channel $\phi_1, \ldots \phi_n$ parallely and respectively outputs a single selected weighted chip depending on the select signal $slt_1$.

An adder $ADD_k$, shown in FIG. 4, comprises a first adder register R31, R32 . . . taking in said samples selected by said multiplexer at said clock rate of OS*CLK and an addition unit $SUM_1$, $SUM_2$ . . . receiving as inputs an input from said first adder register and an output from an adder multiplexer MUX, $M2_1$, $M2_2$ . . . and outputting added samples of said inputs to a second adder register $R4_1$, $R4_2$ . . . taking in said added samples at said clock rate of OS*CLK, said adder multiplexer receiving as inputs an output from said second adder register R41, R42 . . . and a digital "zero" signal. Furthermore, the adder multiplexer MUX receives a reset signal $rst_k$ ($rst_1$, $rst_2$, . . . ) from the control logic CL. Essentially, the combination of $M1_1$, $R3_1$, $SUM_1$, $R4_1$ and $M2_1$ is according to the combining apparatus disclosed in the above mentioned European patent application EP 98 121 518.9 which is herein incorporated in the present application via reference.

As is indicated in FIG. 5, the registers R3 after the respective multiplexer M1 have an oversampling rate of OS*CLK. At each OS*CLK cycle another weighted chip of a particular channel is stored, where the order of channel indices will be fixed by the control logic by means of the select signals $slt_k$ ($slt_1$, $slt_2$, . . . ). The circuit after R3 is basically an accumulator structure with the possibility to switch the value 0 to the other input line of the adder. The result of each sector-carrier is now calculated sequentially within each subprocessing unit by adding the switched through weighted chips. When a new result is being calculated for a sector-carrier, a zero value is switched to the second input line of the adder with the help of M2. This means, that the first channel, which has to be calculated for this sector-carrier is added with 0. This is stored in R4 which is driven by the same oversampling rate OS*CLK. Now, there is the possibility to couple back this result and add it with the next channel (weighted chip) selected by the n-to-1 multiplexer M1. When a result is obtained for a sector-carrier, the control logic gives an enable signal to one of the flip-flops F1 which constitute the subprocessing output register $F1_1$ shown in FIG. 4. Thereafter, the result for another sector-carrier can be calculated with the accumulator structure.

When all results are calculated for every sector-carrier within one subprocessing unit and these are stored in the said flip-flops F1, they are switched through by the multiplexer M3 to the set of registers R5 operated again at the chip rate. The flip-flops F1 constitute the adder output registers $F1_k$ shown in FIG. 5. The register R5 corresponds to the output means OM shown in FIG. 4.

In parallel, as is indicated in FIG. 3, the next set of weighted chips (data sets) is processed by the second subprocessing unit $SU_2$ in the same way (the subprocessing unit SU2 does not wait until the subprocessing unit SU1 has finished its operations and calculations). Therefore, the control signals for this subprocessing unit are basically the same. It is important to note that the processing in the next subprocessing unit is delayed by one CLK cycle, since the second set of weighted chips is stored one CLK cycle after the first one and it has to be processed in the same order (it should be noted that order here means the sequence in which the multiplexer M1 switches through the weighted chips). For a sector-carrier, a continious stream of combined output values is provided at the chip rate, wherein each output value consists of a combination of one or more input samples arriving at the same time as is schematically indicated in FIG. 3.

In all the above examples of flip-flops, it should be understood that "flip-flop" designates an element, which is clocked at a certain clock rate. An enable signal causes the storage of the input of the flip-flop by the next active clock edge.

That is, in FIG. 5 the data sets are respectively stored in the input registers R2 for a time period corresponding to the clock rate of CLK/k. The multiplexer M1 performs a sequential selection of chips (digital data samples) dependent on the select signal $slt_k$ of the control unit CL. The adding structure consisting of the register R3, the adder SUM, the register R4 and the multiplexer M2 operates to add the sequentially selected weighted chip values into a single combined (added) weighted chip value which is then provided to the respective sector-carrier, i.e. to the respective flip-flop F11 provided for this specific sector-carrier. Whenever the adding process is started for a given output, the multiplexer $M2_1$, in response to the reset signal $rst_1$, switches through a "0" value which is then applied to the respective adding unit $SUM_1$.

The circuit of the combiner CMB in FIG. 5 allows the flexible combination of channels in each subprocessing unit, since the register R1 parallely applies the data set to the respective input registers $R2_1$, $R2_2$ etc. The adding structure of the register R3, SUM, R4 and the multiplexer M2 operate according to known principles, namely sequentially to add up all chip values for the relevant sector-carrier.

It should be stressed that the combiner according to the invention can also be applied to complex-valued inputs. In such an application, the combiner according to FIGS. 3 to 5 may be realised twice (once for the real parts and once for the imaginary parts of the inputs), wherein the control signals slt, rst and str are the same for the two combiners. Alternatively, one may build a combiner with twice as many inputs and twice as many outputs. Such an implementation is described below with reference to FIGS. 6 and 7.

SECOND EMBODIMENT OF THE INVENTION

In addition to using the combiner according to the invention in CDMA transmitters as explained with reference to FIGS. 4, 5, the combiner can also be applied to CDMA receivers, in particular to so-called RAKE receivers (see, e.g., K. D. Kammeyer: "Nachrichtenübertragung", B. G. Teubner, 2nd edition, 1996, pp.658–672).

Figure 6:
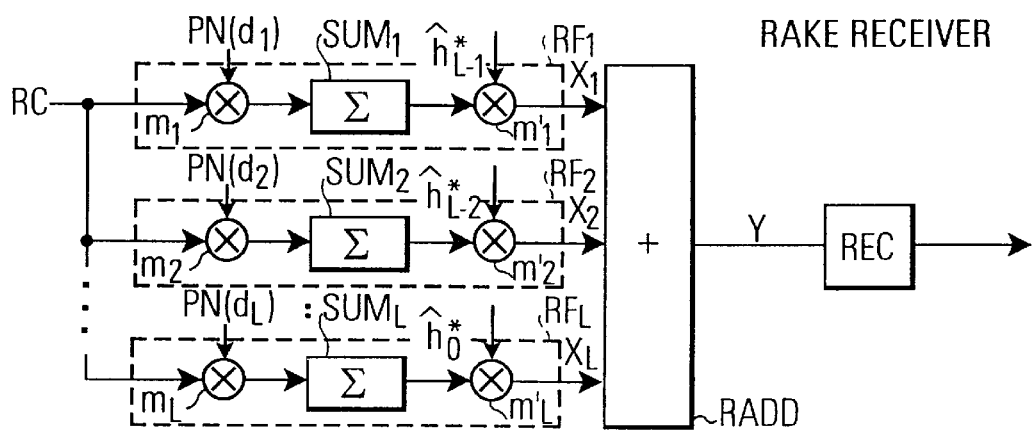
FIG. 6 shows a functional block diagram of a RAKE receiver.

FIG. 6 shows a functional block diagram of a RAKE receiver. Basically, it comprises a number L of so-called RAKE fingers $RF_1$, $RF_2$, ..., $RF_L$, a combiner RADD as well as a receiving unit REC. In each RAKE finger the received complex baseband signal RC sampled at chip rate is multiplied with an appropriately delayed channel-specific pseudo noise sequence $PN(d_1), PN(d_2) ... PN(d_L)$ in the first multiplier $m_1$, $m_2$ ... $m_L$ is added over the period of the PN sequence in the adder $SUM_1$, $SUM_2$, $SUM_L$ and is multiplied with an estimated channel coefficient $h^*_{L-1}$, $h^*_{L-2}$, $h^*0$ in the second multiplier $m_1'$, $m_2'$ ... $m_L'$, where the asterisk denotes complex conjugation. Different delays $d_1$, $d_2$, ... $d_L$ are used for the multiplication with the PN sequence in each RAKE finger. The combiner RADD combines all outputs $x_1$, $x_2$ ... $x_L$ from the RAKE fingers to the input Y of the receiving unit REC.

Figure 7:
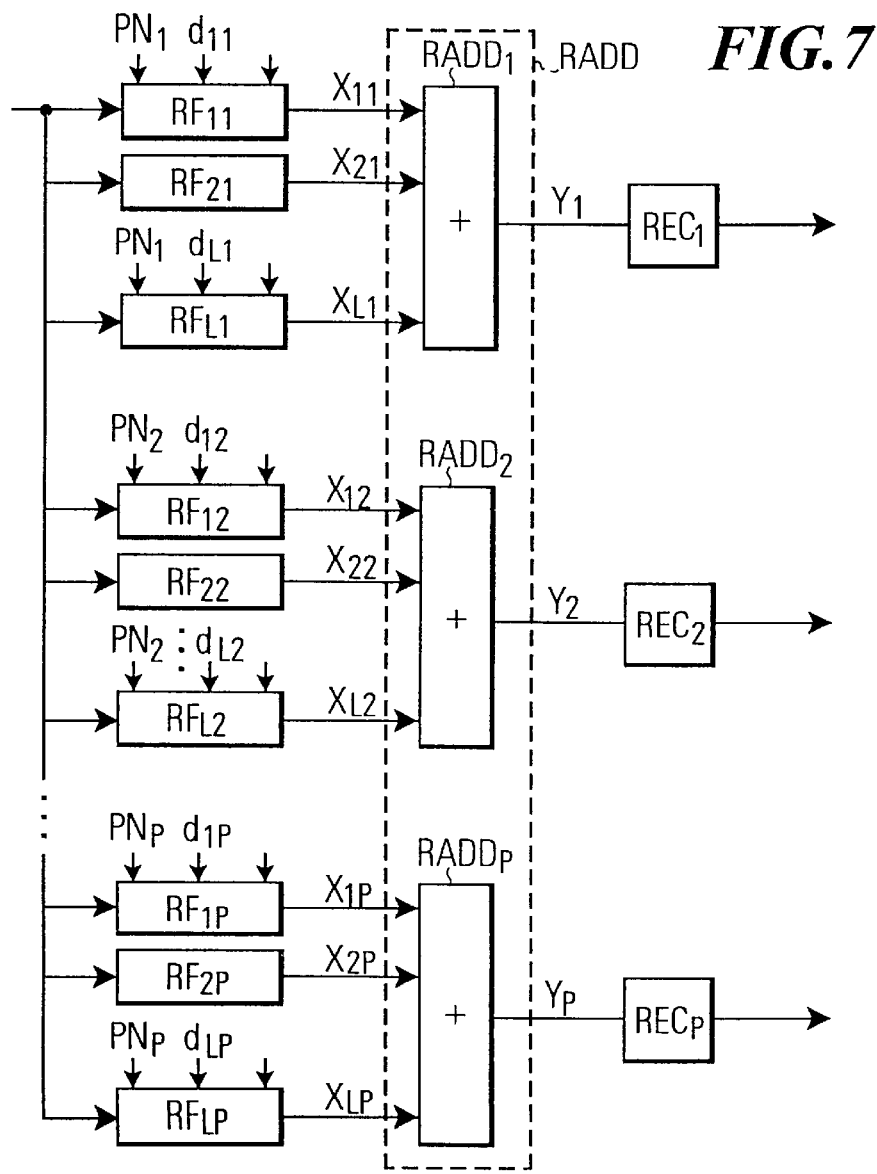
FIG. 7 shows a functional block diagram of a RAKE receiver using a combining technique according to the invention.

It should be understood that FIG. 6 shows the functional blocks necessary for the reception of a single channel. In practice, many channels need to be received. In this case for each channel a set of RAKE fingers as well as an additional combiner are required. In FIG. 7 the i-th RAKE finger for the j-th channel is denoted $RF_{ij}$ while the j-th addition node is designated with $RADD_j$, where i=1, ..., L and j=1, ..., P. It is the task of each combiner $RADD_j$ to combine (add) predetermined ones of the RAKE finger outputs $x_{1j}, x_{2j}, ..., X_{Lj}$ into a single output signal $y_j$. Thus, considering all adders $RADD_1, ..., RADD_p$ together, the task of the overall combiner RADD is to combine predetermined ones of the L*P inputs onto a total of P outputs.

This task can be solved advantageously by the combiner proposed in this invention. However, depending on the modulation scheme used, the inputs and outputs of RADD may be complex valued, so that the real and imaginary parts of the inputs $x_{ij}$ and outputs $y_j$ correspond to separate inputs and outputs of the inventive combiner. Comparing the FIGS. 7 and 3–5, the following correspondences exist between the respective inputs and outputs of the combiners and the respective numbers of inputs and outputs:

$Re\{x_{11}\} = \varphi_1$  $Re\{y_1\} = sc1$  $2LP = n$ $Im\{x_{11}\} = \varphi_2$  $Im\{y_1\} = sc2$  $2P = m$ $Re\{x_{21}\} = \varphi_3$  :

$Im\{x_{22}\} = \varphi_4$  $Re\{y_P\} = sc(2P-1)$

:  $Im\{y_P\} = sc2P$ $Re\{x_{L1}\} = \varphi_{2L-1}$ $Im\{x_{L1}\} = \varphi_{2L}$

:

$Re\{x_{LP}\} = \varphi_{2LP-1}$ $Im\{x_{LP}\} = \varphi_{2LP}$

Thus, the inventive combiner explained above with reference to FIGS. 3–5 can be advantageously used for the combiner RADD of the RAKE receiver shown in FIGS. 6, 7.

It should also be noted that, in this application, the combiner according to the invention allows for a further reduction in the hardware effort required. If the combiner was realized as a separate hardware for each channel (c.f. FIGS. 2-1, 2-2), in a realistic application, it would have to have a high number of inputs (e.g. L=8), because the number of inputs would have to correspond to the number of Rake fingers required in the worst case. For P=32 channels, a total of LP=256 Rake finger processing units $RF_{ij}$ would be required in this example. On the other hand, when any Rake finger output $x_{ij}$ can be combined onto any receiving unit $REC_j$, as is the case with the combiner according to this invention, the total number $\overline{L}P$ of Rake finger processing units can be calculated from the average number $\overline{L}$ of Rake fingers necessary for each channel. For $\overline{L}=3$, a total of 256-$\overline{L}P$=256-96=160 Rake finger processing units can be spared in the above example while still providing the possibility to allocate more than the average number $\overline{L}$ to some receiving units.

INDUSTRIAL APPLICABILITY

The present invention can be used with any digital communication system and not only with a CDMA communication system using weighted chips for the combination of data from the respective user channels. That is, the invention can be applied to any apparatus where a need exists to add several inputs in a flexible way in order to obtain added outputs. In particular, without however being limited thereto, the digital radio communication system is a CDMA radio communication system, said digital data samples are weighted chips output by a spreading/power weighting unit of a CDMA base transceiver station BTS of said CDMA system and said outputs or carriers are sector-carriers respectively provided for sectors of said CDMA system.

Thus, the invention can be used in all digital communication systems where a need is generated that the digital data of a plurality of user channels must be combined onto a predetermined sector-carrier of a number of m sector-carriers.

What has been described above only refers to a particularly preferred embodiment, however, the invention is not restricted to the disclosure in the description and the claims. That is, various modifications and variations can be carried out within the invention as defined with the appended claims.

Reference numerals in the claims only serve clarification purposes and do not limit the scope of protection of these claims.

What is claimed is:

1. A combiner (CMB) for combining digital data samples from a predetermined number n of inputs ($\phi_1, \ldots, \phi_n$) onto a predetermined number m of outputs (sc-1, sc-2, . . . sc-m), said digital data samples having a predetermined bit width (in_bit) and arriving parallely at said combiner as data sets respectively consisting of one data sample from each input at a predetermined common data rate CLK (CLK, $t_0, t_1, \ldots, t_{k-1}, t_k$), comprising
   a) a plurality of k subprocessing units $SU_1, SU_2, \ldots, SU_{i-1}, SU_i, \ldots, SU_k$ which respectively include:
      a1) an input register ($R2_1, R2_2, R2_k$) for downsampling and storing arriving data sets at a clock rate of CLK/k; and
      a2) a multiplex/add means ($M1_k$; $ADD_k, R3_k, SUM_k, R4_k$, $F1_k$) for receiving said data sets stored in said input register and for outputting at said clock rate of CLK/k, for each of said m outputs, an added data sample respectively formed by an addition of predetermined ones of said stored data samples; and
   b) a selector (M3) for cyclically selecting at the common data rate CLK from said multiplex/add means of said subprocessing units a respective output data set consisting of said m added data samples; and
   c) wherein the sampling phase of the input register of subprocessing unit $SU_i$ is delayed by 1/CLK with respect to the sampling phase of the input register of the subprocessing unit $SU_{i-1}$, where i=2,3, . . . ,k.

2. A combiner (CMB) according to claim 1, wherein an input means (IM; R1) is provided for inputting the data sets to each of said input registers of said k subprocessing units at the common data rate CLK (CLK, $t_0, t_1, \ldots, t_{k-1}, t_k$).

3. A combiner (CMB) according to claim 1, wherein each of multiplex/add means comprises:
   a multiplexer ($M1_1, M1_2, M1_k$) for sequentially selecting, for each of said m outputs, said predetermined ones of said stored data samples, at a clock rate of OS*CLK, where OS=n/k is an oversampling factor;
   an adder (ADDk) for adding for each of said m outputs said selected data samples into said respective added data sample at said clock rate OS*CLK; and
   an output register ($F1_1, F1_2, F1_k$) for storing for said m outputs an output data set comprising said m added data samples.

4. A combiner (CMB) according to claim 3, wherein said selector (M3) selects said output data sets from said respective output register of said subprocessing units; and
an output means (OM) is provided for outputting said selected output data sets on said outputs (SC-1, . . . , SC-m) at said common data rate CLK (CLK, $t_0, t_1, \ldots, t_{k-1}, t_k$).

5. A combiner (CMB) according to claim 3, wherein each adder (ADDk) comprises a first adder register (R31, R32) taking in said samples selected by said multiplexer at said clock rate of OS*CLK and an addition unit (SUM) receiving as inputs an output from said first adder register and an output from an adder multiplexer (MUX, M21, M22) and outputting added samples of said inputs to a second adder register (R41, R42) taking in said added samples at said clock rate of OS*CLK, said adder multiplexer receiving as inputs an output from said second adder register (R41, R42) and a digital "0" signal.

6. A combiner (CMB) according to claim 1, wherein the digital data samples are weighted chips output by a spreading/power weighting unit (2) of a CDMA base transceiver station (BTS) of a CDMA radio communication system and the outputs are sector-carriers respectively provided for sectors of said CDMA system.

7. A combiner (CMB) according to claim 1, wherein the inputs ($\phi_1, \ldots, \phi_n$) are user channels and/or preadded channels and the ouptuts are carriers of a digital communication system.

8. A combiner (CMB) according to claim 1, characterized in that the inputs ($\phi_1, \ldots \phi_u$) are outputs ($x_{11} \ldots X_{L1}; x_{12} \ldots x_{L2}; \ldots, x_{1P} \ldots x_{LP}$) of RAKE fingers ($RF_1 \ldots RF_L$) of a RAKE receiver and the outputs (sc-1, sc-2, . . . sc-m) are inputs of respective receiving units of said RAKE receiver.

9. A combiner (CMB) for combining digital data samples from a predetermined number n of inputs ($\phi_1, \ldots, \phi_n$) onto a predetermined number m of outputs (sc-1, sc-2, . . . sc-m), said digital data samples having a predetermined bit width (in_bit) and arriving parallely at said combiner as data sets respectively consisting of one data sample from each input at a predetermined common data rate CLK (CLK, $t_0, t_1, \ldots, t_{k-1}, t_k$), comprising
   a) a plurality of k subprocessing units $SU_1, SU_2, \ldots, SU_{i-1}, SU_i, \ldots, SU_k$ which respectively include:
      a1) an input register ($R2_1, R2_2, R2_k$) for downsampling and storing arriving data sets at a clock rate of CLK/k; and
      a2) a multiplex/add means ($M1_k$; $ADD_k, R3_k, SUM_k, R4_k$; $F1_k$) for receiving said data sets stored in said input register and for outputting at said clock rate of CLK/k, for each of said m outputs, an added data sample respectively formed by an addition of predetermined ones of said stored data samples; and
   b) a selector (M3) for cyclically selecting at the common data rate CLK from said multiplex/add means of said subprocessing units a respective output data set consisting of said m added data samples; and
   c) wherein the sampling phase of the input register of subprocessing unit $SU_i$ is delayed by 1/CLK with respect to the sampling phase of the input register of the subprocessing unit $SU_{i-1}$, where i=2,3, . . . ,k; and
wherein
an input means (IM; R1) is provided for inputting the data sets to each of said input registers of said k subprocessing units at the common data rate CLK (CLK, $t_0$, $t_1, \ldots, t_{k-1}, t_k$); and wherein each of multiplex/add means comprises:
  a multiplexer ($M1_1$, $M1_2$, $M1_k$) for sequentially selecting, for each of said m outputs, said predetermined ones of said stored data samples, at a clock rate of OS*CLK, where OS=n/k is an oversampling factor;
  an adder (ADDk) for adding for each of said m outputs said selected data samples into said respective added data sample at said clock rate OS*CLK; and
  an output register ($F1_1$, $F1_2$, $F1_k$) for storing for said m outputs an output data set comprising said m added data samples, and wherein said selector (M3) selects said output data sets from said respective output register of said subprocessing units; and an output means (OM) is provided for outputting said selected output data sets on said outputs (SC-1, ..., SC-m) at said common data rate CLK (CLK, $t_0, t_1, \ldots, t_{k-1}, t_k$); and wherein each adder (ADDk) comprises a first adder register (R31, R32) taking in said samples selected by said multiplexer at said clock rate of OS*CLK and an addition unit (SUM) receiving as inputs an output from said first adder register and an output from an adder multiplexer (MUX, M21, M22) and outputting added samples of said inputs to a second adder register (R41, R42) taking in said added samples at said clock rate of OS*CLK, said adder multiplexer receiving as inputs an output from said second adder register (R41, R42) and a digital "0" signal.

* * * * *